United States Patent
Buechele

Patent Number: 5,964,025
Date of Patent: *Oct. 12, 1999

[54] METHOD OF MAKING A BACKING STRIP FOR EXTRUDED WINDSHIELD WIPER SQUEEGEE

[75] Inventor: Franz Buechele, Lawrenceburg, Tenn.

[73] Assignee: ACD Tridon Inc., Burlington, Canada

[ * ] Notice: This patent is subject to a terminal disclaimer.

[21] Appl. No.: 08/936,173

[22] Filed: Sep. 24, 1997

Related U.S. Application Data

[63] Continuation-in-part of application No. 08/694,822, Aug. 9, 1996, Pat. No. 5,697,156.

[51] Int. Cl.⁶ .................................................. B23P 13/04
[52] U.S. Cl. .................. 29/558; 15/250.361; 15/250.453
[58] Field of Search .............. 15/250.41, 250.43, 15/240.451, 240.452, 250.361, 250.44, 250.453, 250.48, 250.454; 29/557

[56] References Cited

U.S. PATENT DOCUMENTS

| | | |
|---|---|---|
| 3,018,500 | 1/1962 | Anderson . |
| 3,076,993 | 2/1963 | Anderson . |
| 3,117,336 | 1/1964 | Reese . |
| 3,141,186 | 7/1964 | Scinta . |
| 3,386,123 | 6/1968 | Oishei ................................. 15/250.42 |
| 3,616,485 | 11/1971 | Quinlan et al. . |
| 3,659,310 | 5/1972 | Rosen . |
| 3,822,577 | 7/1974 | Roberts ..................................... 72/379 |
| 4,177,538 | 12/1979 | Blaiklock et al. ................... 15/250.39 |
| 4,264,998 | 5/1981 | Stratton . |
| 4,782,549 | 11/1988 | Beneteau et al. . |
| 4,796,326 | 1/1989 | Beneteau et al. . |
| 5,023,972 | 6/1991 | Bauer et al. . |
| 5,231,730 | 8/1993 | Schmid et al. . |
| 5,697,156 | 12/1997 | Buechele ............................... 29/897.2 |

FOREIGN PATENT DOCUMENTS

| | | |
|---|---|---|
| 007017 A1 | 6/1979 | European Pat. Off. . |
| 158070 B1 | 2/1985 | European Pat. Off. . |
| 667266 A1 | 8/1995 | European Pat. Off. . |
| 0783998A1 | 7/1997 | European Pat. Off. .......... B60S 1/38 |
| 783 998 A1 | 7/1997 | European Pat. Off. . |
| 32 08 749 A1 | 3/1982 | Germany . |
| 901282 | 7/1962 | United Kingdom . |
| 2191083 | 12/1987 | United Kingdom . |
| 2227406 | 8/1990 | United Kingdom . |
| 2239589 | 7/1991 | United Kingdom . |
| 2243991 | 11/1991 | United Kingdom . |
| 2245482 | 1/1992 | United Kingdom . |

*Primary Examiner*—S. Thomas Hughes
*Assistant Examiner*—Steven A. Blount

[57] ABSTRACT

A rail forming part of a backing strip for a windshield wiper squeegee is formed from a blank comprising a flat metal strip of narrow width. The metal strip is deformed to create an offset portion that extends transversely on a longitudinal axis of the strip so as to protrude on one side of the flat metal strip and a claw retention notch is edge-punched from the offset portion. At least one pair of rubber squeegee-retaining barb elements is formed from the flat metal strip on the side opposite from the offset portion proximate to the claw retention notch, the barb elements being longitudinally spaced from each other on the metal strip with the claw retention notch disposed between at least two barb elements so that pressure applied to the windshield wiper through the superstructure and transmitted by a claw retained in the claw retention notch to the rail urges the outwardly extending barb elements into engagement with the squeegee.

9 Claims, 3 Drawing Sheets

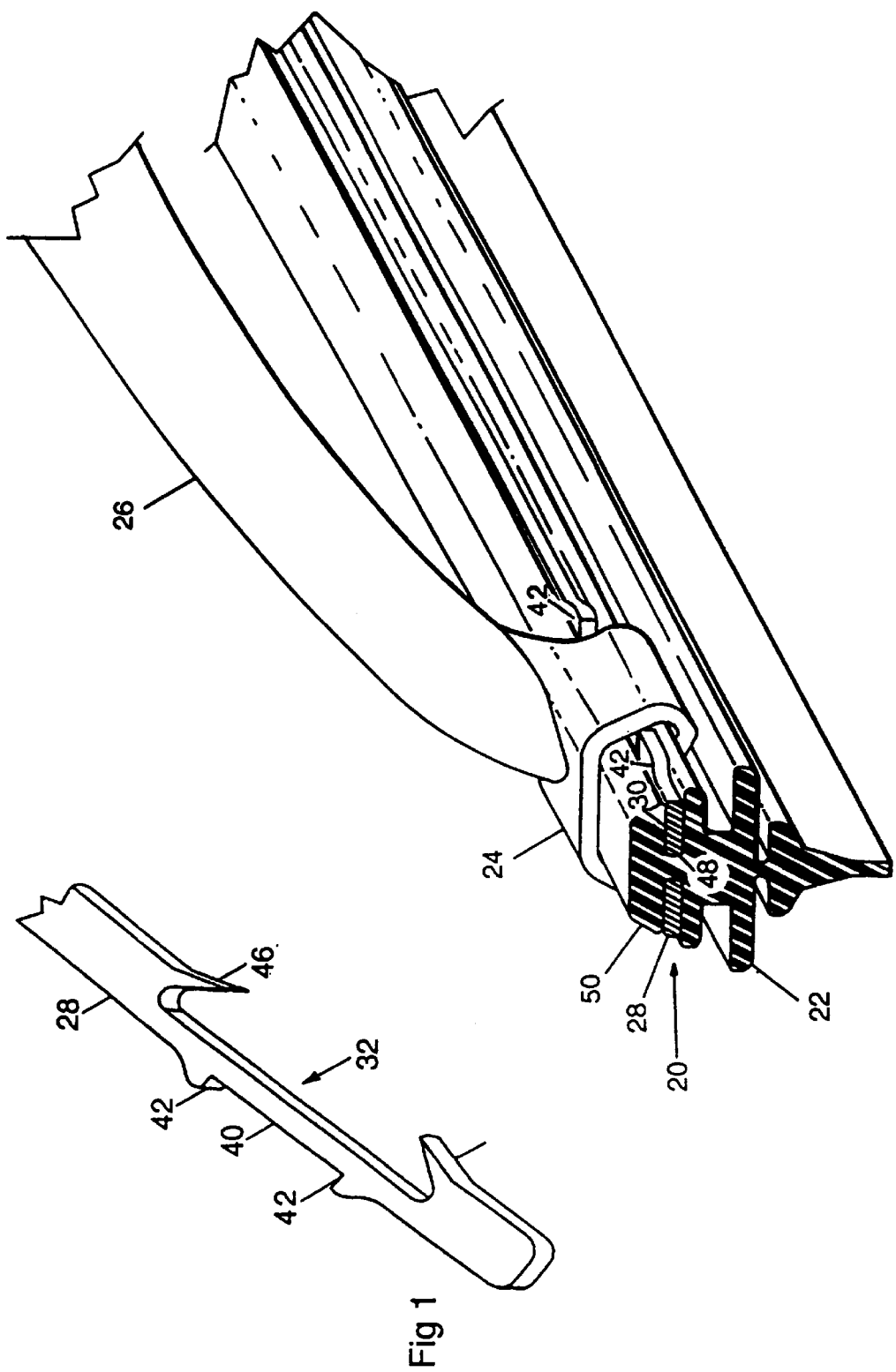

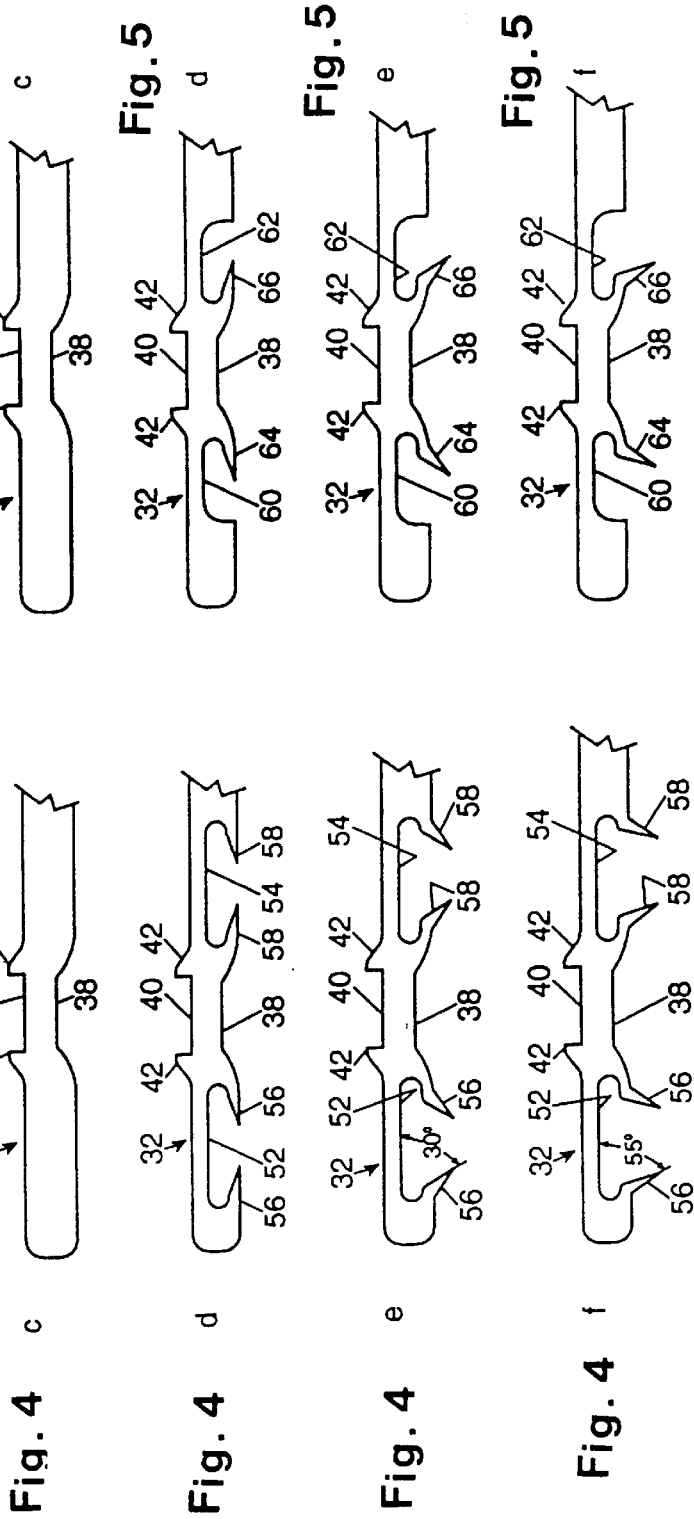

5,964,025

METHOD OF MAKING A BACKING STRIP FOR EXTRUDED WINDSHIELD WIPER SQUEEGEE

This is a continuation-in-part of application Ser. No. 08/694,822 filed Aug. 09, 1996, now U.S. Pat. No. 5,697,156.

FIELD OF THE INVENTION

This invention relates to a backing strip, also known as a vertebra or spine, and used in association with a rubber squeegee in windshield wiper assemblies to stiffen the squeegee and to provide mounting attachments for coupling the squeegee to the windshield wiper superstructure.

BACKGROUND OF THE INVENTION

One form of backing strip comprises a flat metal strip having a central longitudinal slot dividing the strip into a pair of rails and into which the neck portion of a molded rubber squeegee is positioned with the retention bead of the squeegee lying between the backing strip and the wiper superstructure. The rails may be joined at the ends of the strip if the slot is made to extend slightly less than the full length of the backing strip or the rails may be separate and coupled at the ends of the backing strip by means of a clip. In the former case, the squeegee itself has usually been fabricated with location means during a molding process whereas, in the latter, the squeegee may be fabricated by extrusion which greatly improves tolerances and consistency in the squeegee profile, thereby improving productivity and reducing costs.

Some backing strip structures comprising rail pairs have been proposed in which at least one rail is formed with a barb portion for penetrating the squeegee and to thereby prevent relative longitudinal movement between the backing strip and the squeegee and obviate the need to use a clip. Examples of such structures may be found in GB 2,243,991 and DE 3,208,749.

In both of these patents, the barb is longitudinally spaced from an abutment or notch-like structure which cooperates with a claw in the end yoke of a wiper superstructure to attach to the spine.

It will be understood that maximum stress is applied to the squeegee through the yokes of the superstructure where they are attached to each other, namely at the claws, and therefore that it is desirable to minimize said spacing between a barb and a notch.

It is also desirable to secure only one end of the squeegee so that the remainder of the squeegee can slide relative to the retaining structure and thereby adapt to the changing surface of a windshield, particularly in modern automobiles where the squeegee must wrap on a windshield having a pronounced curvature.

An object of this invention is to provide a method of fabricating such a spine structure which is economical and easy and to provide a structure for a backing strip which will reliably couple the squeegee to the windshield wiper superstructure by minimizing the longitudinal separation between squeegee retaining barbs and a claw retaining notch.

SUMMARY OF THE INVENTION

In accordance with this invention, there is provided a method of fabricating a rail forming part of a backing strip for a windshield wiper squeegee from a blank comprising a flat metal strip of narrow width, the strip having a longitudinal axis, and the method including the following steps:

forming an offset portion of predetermined length on an intermediate portion of the strip, the offset portion extending transversely on said longitudinal axis so as to protrude from the remainder of the strip on one side thereof, said offset portion defining a hollow disposed on the opposite side of the flat metal strip;

edge-punching said offset portion to form a claw retaining notch adapted to locate a claw forming part of a windshield wiper superstructure;

cutting at least one opening in said intermediate portion so that the metal adjacent to said hollow forms at least one squeegee retaining barb element of reduced cross-sectional width; and pulling said at least one barb element outwardly in a direction transverse to said longitudinal axis so as to protrude outwardly from the strip, the said at least one barb element being proximate to the claw retaining notch so that pressure applied to a windshield wiper through the superstructure and transmitted by a claw retained in the claw retaining notch to the rail urges the said at least one barb element into engagement with the squeegee.

The invention also provides for a rail made by a method in accordance with the invention.

BRIEF DESCRIPTION OF THE DRAWINGS

In order that the invention may be more clearly understood, preferred embodiments are described below with reference to the accompanying drawings, in which:

FIG. 1 is a perspective view of a portion of a rail forming part of a backing strip and made in accordance with the invention;

FIG. 2 is a perspective view of a portion of a windshield wiper assembly showing a cross-sectional view through a squeegee and backing strip incorporating a pair of rails made in accordance with the invention;

FIGS. 4 a–e are similar views to FIGS. 3 a–e showing process steps for fabricating a first alternative embodiment of a rail in accordance with the invention; and FIGS. 5 a–e are similar views to FIGS. 3 a–e showing process steps for fabricating a second alternative embodiment of a rail in accordance with the invention.

DESCRIPTION OF PREFERRED EMBODIMENT

Figure 3A:
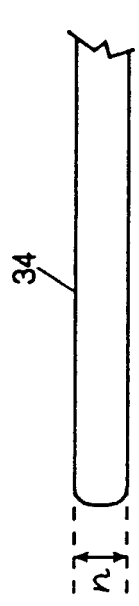
FIGS. 3 a–e are schematic top elevation views of a portion of a rail forming part of a backing strip, and showing process steps for fabricating a rail in accordance with the invention.
Figure 3B:
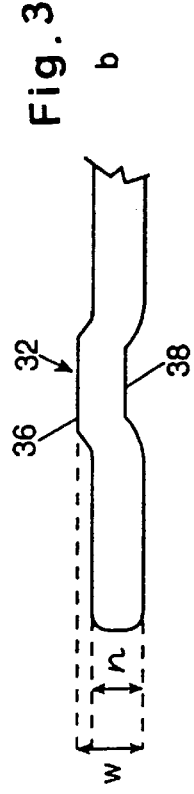

A backing strip made in accordance with the invention is generally designated by numeral 20 in FIG. 2 of the drawings. The backing strip 20 which is also known as a vertebra or spine is associated with a rubber squeegee 22 in a windshield wiper assembly and is used to stiffen the squeegee throughout its length while allowing the squeegee to flex in an orthogonal direction to the length of the squeegee so that it can conform to the surface of a curved windshield. The backing strip 20 is attached to a windshield wiper superstructure by means of a claw termination 24 on a yoke 26 forming part of a wiper superstructure.

In accordance with the invention, the backing strip 20 comprises a pair of congruent rails 28, 30 of which one is shown in greater detail in FIG. 1. Each rail is fabricated from a blank comprising a flat metal strip of narrow width and would typically be formed by rolling stainless steel wire having a selected diameter. The strip formed by rolling the wire will typically have a width of 25 mm and a thickness of 8 mm. The strip itself may be of indefinite length or cut to predetermined lengths commensurate with the size of the windshield wiper superstructure with which the backing strip is intended to be used.

An intermediate portion 32 of the backing strip 20 adjacent one end of the strip is shaped to receive the claw termination 24 and has retention means for securing the rails 28, 30 to the squeegee 22.

The processing sequence for shaping rails 28, 30 is shown in FIG. 3 of which FIG. 3*a* shows a blank 34 comprising the above-mentioned flat metal strip. The blank 34 is formed with an offset portion 36 shifted transversely from a longitudinal axis defined by the length of the strip so as to protrude from the remainder of the strip on one side, a hollow 38 being defined on the opposite side of the strip during such deformation. The position of the offset portion 36 is selected to be adjacent one end of the strip and spaced from the end by a distance commensurate with the claw position in the intended superstructure. This step is shown in FIG. 3*b*.

Figure 3C:
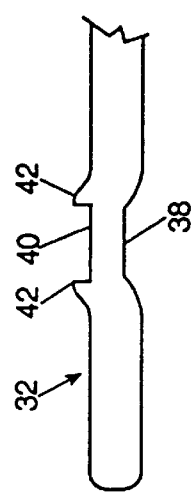

The offset portion 36 is edge-punched to form a claw retaining notch 40 defined by a pair of longitudinally-spaced abutments 42 and adapted to locate a claw, such as the claw termination 24, therebetween. This step is shown in FIG. 3*c*.

Figure 3D:
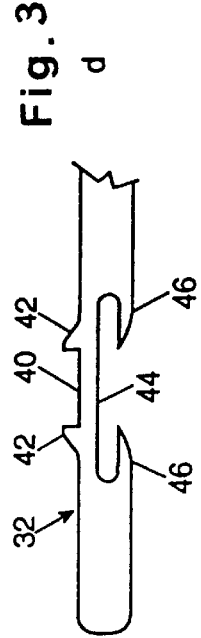

On the opposite side of the notch 40, a longitudinally extending opening 44 is cut from the intermediate portion 32 at the hollow 38 and the opening 44 is shaped so that the metal adjacent to the hollow forms a pair of barb elements 46 of reduced cross-sectional width. The opening 44 is opposite the claw retaining notch 40 and is transversely aligned therewith. This step is shown in FIG. 3*d*. It will be seen that the notch 40 is disposed on the opposite side of the rail between the barb elements 46 and that the barb elements 46 have pointed terminations which will penetrate the rubber material of the squeegee 22.

Figure 3E:
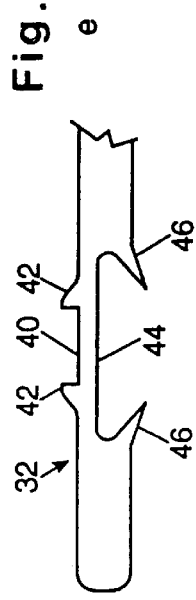

In a final step, shown in FIG. 3*e*, the barb elements 46 are pulled outwardly in a direction transverse to the aforementioned longitudinal axis so as to protrude outwardly from the rail. If the blank 20 is of indefinite length, it would also be trimmed to the required length to match the intended wiper superstructure.

It will be appreciated that the processing sequence, in accordance with the method of the invention, allows a claw retaining notch 40 to be cut after deformation of the blank 34 and therefore there is very little wasted material which must be discarded or recycled. The deformation also selectively increases the effective width of the rail indicated by "w" in FIG. 3*b* so that it exceeds the nominal width of the blank indicated by "n" in FIG. 3*a*. The increased width in the intermediate portion 32 accommodates both the claw retaining notch 40 and the opening 44 to form the barb elements 46 so that they can be formed on opposite sides of the rail.

The resulting configuration is most desirable since any pressure on the windshield wiper superstructure applied through the claw termination 24 to the rails (28, 30) will result in a more positive retention of the squeegee 22 through the barb elements 46.

Conveniently, the method, in accordance with the invention, permits the barb elements to be disposed in the immediate vicinity of the notch for receiving the claw termination without waste of material and without unduly increasing the width of the strip to exceed accepted standards in the industry which could otherwise necessitate changes in the fabrication of both the squeegee and the wiper superstructure.

In use, it will be understood that the rails 28, 30 are each disposed on opposite sides of the squeegee 22 in respective longitudinal grooves which define a reduced diameter neck portion 48 in the squeegee with a retention bead 50 of the squeegee lying between the rails 28, 30 and the wiper superstructure. The rails 28, 30 are oriented so that the respective claw retaining notches 40 open outwardly to receive and locate respective ends of claw terminations of the wiper superstructure 24 while the barb elements 46 are oriented so as to penetrate the reduced diameter neck portion 48 of the squeegee 22.

It will be understood that several variations may be made to the above-described preferred embodiment of the invention within the scope of the appended claims. In particular, it will be understood that any suitably shaped abutments may be used to locate the claw termination 24 and that the shape and configuration of the claw retaining notch 40 illustrated is only exemplary. Similarly, the number of barb elements 46 and the shape of the associated opening 44 made to form the barb elements may vary, as will be apparent to those skilled in the art.

It will be appreciated that deformation of the blank 34 to form the offset portion 36 may reduce the thickness of the flat metal strip so that the barb elements 46 formed proximate to the claw retaining notch 40 are possibly too thin for effective penetration into the rubber squeegee.

In order to form barb elements which have a somewhat thicker cross-section, the associated openings may be cut from the intermediate portion 32 of the blank 34 in the area immediately adjacent the offset portion 36.

Illustrative embodiments showing such variations of the invention are drawn in FIGS. 4 and 5 where like numerals to FIG. 3 have been retained to identify like parts.

The initial processing steps drawn in FIGS. 5 *a* to *c* are the same as the steps drawn in FIGS. 4 *a* to *c* and will not be described again.

In FIG. 4*d*, it will be seen that a pair of openings 52, 54 are cut from the intermediate portion 32. The openings 52, 54 are longitudinally spaced from each other on the flat metal strip with the hollow 38 disposed between the openings 52, 54. Each opening 52, 54 forms a respective pair of oppositely directed barb elements 56, 58 having a reduced cross-sectional width of which the inner barb elements 56, 58 are formed from metal adjacent to the hollow 38.

The barb elements 56, 58 are subsequently pulled outwardly to protrude from the flat metal strip and are adapted to penetrate a rubber squeegee. In FIG. 4*e*, the barb elements 56, 58 form a 30° angle with respect to the longitudinal axis of the flat metal strip. If a more pronounced angle is required for greater penetration into the squeegee, the barb elements 56, 58 may be further bent to form an angle of 55° with respect to the longitudinal axis of the flat metal strip, as shown in FIG. 4*f*.

In a second alternative embodiment of the invention, the initial processing steps drawn in FIGS. 5*a* to *c* are again similar to those in FIGS. 3 *a* to *c* and are not further described. In FIG. 5*d*, a pair of openings 60, 62 are cut from the intermediate portion 32 and the openings 60, 62 are longitudinally spaced from each other on the flat metal strip with the hollow 38 disposed between the openings 60, 62.

Unlike the embodiment of FIG. 4, the openings 60, 62 are shaped to form only a single respective barb element 64, 66 formed from the metal adjacent to the hollow 38 and oppositely directed from one another.

The barb elements 64, 66 are subsequently pulled outwardly to protrude from the flat metal strip and form an angle of 30° with respect to the longitudinal axis of the flat metal strip as shown in FIG. 5e and can be further pulled to form an angle of up to 60° as shown in FIG. 5f.

I claim:

1. A method of making a rail forming part of a backing strip for a windshield wiper squeegee from a blank comprising a flat metal strip, the flat metal strip defining a longitudinal axis, a narrow width and a predetermined thickness, wherein the width is greater than the thickness, the method including the following steps:

forming an elongated offset portion of predetermined length on an intermediate portion of the flat metal strip, the offset portion being shifted transversely to said longitudinal axis, in a direction of said width, so as to protrude from the remainder of the flat metal strip on a single side thereof, said offset portion defining a hollow disposed on an opposite side of the flat metal strip;

edge-punching said offset portion to form a claw retaining notch adapted to locate a claw forming part of a windshield wiper superstructure cutting at least one opening in said intermediate portion so that the metal adjacent to said hollow forms at least one squeegee retaining barb element of reduced cross-sectional width; and pulling said at least one barb element outwardly in a direction transverse to said longitudinal axis so as to protrude outwardly from the flat metal strip, the said at least one barb element being proximate to the claw retaining notch so that pressure applied to a windshield wiper through the superstructure and transmitted by a claw retained in the claw retaining notch to the rail urges the said at least one barb element into engagement with the squeegee.

2. Method according to claim 1 in which the blank is pre-cut to a desired length prior to formation of the offset portion and the offset portion is formed adjacent one end of the blank at a pre-determined distance from the end of the blank commensurate with the relative position of a claw in a selected windshield wiper superstructure.

3. Method according to claim 1 in which the offset portion is edge-punched to form a pair of abutments defining the claw retaining notch.

4. Method according to claim 1 in which a pair of oppositely directed barb elements is cut from said intermediate portion.

5. A method of making a rail forming part of a backing strip for a windshield wiper squeegee from a blank comprising a flat metal strip, the flat metal strip defining a longitudinal axis, a narrow width and a predetermined thickness, wherein the width is greater than the thickness, the method including the following steps:

forming an elongated offset portion of predetermined length on an intermediate portion of the flat metal strip, the offset portion being shifted transversely to said longitudinal axis, in a direction of said width so as to protrude from the remainder of the flat metal strip on a single side thereof, said offset portion defining a hollow disposed on an opposite side of the flat metal strip;

edge-punching said offset portion to form a claw retaining notch adapted to locate a claw forming part of a windshield wiper superstructure;

cutting at least one opening in said intermediate portion to form at least one pair of squeegee retaining barb elements of reduced cross-sectional width from the flat metal strip on the side opposite from the offset portion and proximate to the claw retaining notch, the barb elements being longitudinally spaced from each other on the metal strip with the claw retention notch disposed between at least two barb elements;

pulling said barb elements outwardly in a direction transverse to said longitudinal axis so as to protrude outwardly from the flat metal strip, so that pressure applied to a windshield wiper through the superstructure and transmitted by a claw retained in the claw retaining notch to the rail urges the barb elements into engagement with the squeegee.

6. Method according to claim 5 in which a single opening is cut from the flat metal strip at said hollow.

7. Method according to claim 5 in which a pair of openings is cut from the intermediate portion, the said openings being longitudinally spaced from each other on the metal strip with the hollow disposed between the said pair of openings.

8. Method according to claim 7 in which a pair of oppositely directed barb elements is formed in each opening during said cutting.

9. Method according to claim 7 in which a single barb element is formed in each opening during said cutting, the barb elements being proximate to the claw retaining notch and oppositely directed.

\* \* \* \* \*